US012745189B2

(12) United States Patent
Amuru et al.

(10) Patent No.: US 12,745,189 B2
(45) Date of Patent: Sep. 22, 2026

(54) SYSTEMS AND METHODS FOR THE CONTROL AND MANAGEMENT OF A PLURALITY OF WIRELESS DEVICES IN A LOCATION

(71) Applicant: PLUME DESIGN, INC., Palo Alto, CA (US)

(72) Inventors: Saidhiraj Amuru, Manikonda (IN); Michal Kazior, Częstochowa (PL); Badri Srinivasan Sampathkumar, Fremont, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 297 days.

(21) Appl. No.: 18/439,804

(22) Filed: Feb. 13, 2024

(65) Prior Publication Data

US 2025/0261129 A1 Aug. 14, 2025

(51) Int. Cl.
*H04W 52/24* (2009.01)
*H04W 52/34* (2009.01)

(52) U.S. Cl.
CPC ....... *H04W 52/243* (2013.01); *H04W 52/346* (2013.01)

(58) Field of Classification Search
CPC ............. H04W 52/243; H04W 52/346; H04W 52/245; H04W 52/367
See application file for complete search history.

(56) References Cited

U.S. PATENT DOCUMENTS 10,187,179 B1 1/2019 Jorgovanovi
11,716,694 B2 * 8/2023 Charipadi ........... H04W 52/365 455/522
2013/0073388 A1 * 3/2013 Heath .................... G06Q 30/02 705/14.53
2014/0286219 A1 9/2014 Siomina et al.
2017/0085417 A1 * 3/2017 O'Reirdan ............ H04W 24/04
(Continued)

OTHER PUBLICATIONS

International Search Report and Written Opinion to corresponding Int'l Appln. No. PCT/US2025/014406 mailed Apr. 7, 2025 (19 pages).

*Primary Examiner* — Dominic E Rego
(74) *Attorney, Agent, or Firm* — Nicholas Martin; Greenberg Traurig, LLP

(57) ABSTRACT

Disclosed are systems and methods that provide a decision-intelligence (DI)-based, computerized framework for a decision intelligence (DI)-based computerized framework for controlling and managing multiple devices that are capable of performing automated frequency coordination (AFC) within a particular location. The disclosed framework provides multiple operational solutions between devices, access points, and the like to avoid interference to incumbents. The disclosed framework provides novel capabilities for handling multiple devices that are capable of performing automated frequency coordination in unlicensed bands in a given location. The framework can control, manage and/or otherwise handle cases/instances of fairness of power and frequency allocation to ensure all users/devices receive the requisite power levels. The framework can handle interference from particular devices, portions of a set of devices and/or aggregations of devices within a location so that interference limits are not exceeded.

20 Claims, 7 Drawing Sheets

(56) References Cited

U.S. PATENT DOCUMENTS

2017/0374558 A1* 12/2017 Zhao ..................... H04W 16/10
2019/0191385 A1 6/2019 Shinohara et al.
2020/0320820 A1* 10/2020 Bros ................... G07F 17/3223
2023/0007668 A1* 1/2023 Al-Mufti ............. H04W 72/121
2023/0039222 A1* 2/2023 Jagannathan .......... G06Q 10/40
2025/0240626 A1* 7/2025 Engi ....................... G10L 25/51

* cited by examiner

SYSTEMS AND METHODS FOR THE CONTROL AND MANAGEMENT OF A PLURALITY OF WIRELESS DEVICES IN A LOCATION

FIELD OF THE DISCLOSURE

The present disclosure is generally related to Wireless Fidelity (Wi-Fi or WiFi) network management at a location, and more particularly, to a decision intelligence (DI)-based computerized framework for controlling and managing multiple devices that are capable of performing automated frequency coordination (AFC) within a particular location.

SUMMARY OF THE DISCLOSURE

WiFi technology is evolving at a rapid pace with many new features being introduced to enhance user experience. Some of the features include, for example, MU-MIMO (multi-user, multiple input, multiple output), OFDMA (orthogonal frequency-division multiple access), MLO (multi-link operation), among others. New spectrums, such as, for example, 5 GHz and 6 GHz unlicensed bands are also being made open across to provide more bandwidth for these technologies.

However, certain rules are being formulated to limit the transmission of power in certain unlicensed bands so that they do not interfere with incumbent users. Examples can include 5 GHz and 6 GHz bands where radars and fixed satellite service stations are operating.

Accordingly, as discussed herein, the disclosed systems and methods provide a novel computerized framework that enables, causes and/or allows devices to transmit just enough power so that they do not cause interference to incumbents (e.g., so that they are not exceeding an interference to noise ratio of n dB (e.g., −6 dB, for example). Under conventional mechanisms, a user must access a certain database (e.g., once per day) to identify how much power levels it can transmit the next day and for how much duration. However, the number of devices connected to WiFi for a location(s) can vary (e.g., can significantly increase daily, for example); and many of these devices can support 5 GHz and 6 GHz bands.

In order to obtain maximum benefits of the wide spectrum of the 6 GHz band and to support high throughput applications, many devices would want to use this band and bandwidth. However, certain regulations in Unlicensed National Information Infrastructure (UNII) 5 and 7 band permit standard power operation, where higher power is allowed as opposed to UNII 6 and 8 bands.

According to some embodiments, an AFC system satisfies below certain parameters. In some embodiments, an AFC parameter can verify the validity of standard power access points (APs) Federal Communications Commission (FCC) identifier (ID) (or equivalently European Telecommunications Standards Institute (ETSI) in Europe), and other certification agencies thereby), unique device serial numbers, and the like. In some embodiments, AFC parameters can register, authenticate and authorize AFC device operations. In some embodiments, AFC parameters can be utilized for secure storage of registered information (e.g., FCC ID, unique device serial number, and the like).

In some embodiments, AFC parameters can be utilized to determine frequency availability and maximum permissible (transmission/transmit) power in each frequency range at standard power AP locations at least according to a predetermined time period (e.g., daily—or a 24 hour time duration). According to some embodiments, if multiple inquiries are made in a time period, then the latest AFC spectrum inquiry can be utilized as a response. Indeed, in some embodiments, frequency availability can be computed in steps of no greater than n dB (e.g., 3 dB) below a maximum (k dBm (e.g., 36 dBm) that is permissible in equivalent isotropic radiated power (EIRP), down to a minimum level of m dBm (e.g., 21 dBm).

In some embodiments, based on particular parameters, AFC device operations can be discontinued in particular geographic areas, as discussed herein.

Moreover, in existing systems, to use standard power, an AFC device must access a database setup by a third party, which can connect to a centralized database hosted by FCC/ETSI and other agencies thereof. This database has a list of all incumbents. When an inquiry is sent to the database, a response is provided that provides how much power can be used by the device without causing interference to the incumbents and also for how much time duration and which specific frequencies can be used for the same.

However, there is a technical problem with this approach. When multiple devices are AFC feature capable, and each device individually requests for the AFC database to allow it to transmit, the AFC database may treat each device individually and may not be able to understand that multiple devices have requested it for spectrum access. This is quite possible as different devices are independent of each other and each may support direct access to the AFC database and/or may require a proxy. Accordingly, when such heterogeneous devices are present, and if by mistake the AFC system grants access to all of them to send high power, then there is a problem. Since there can be many devices, specific time cannot be imposed on all devices which can overburden the AFC system implementation. Note that only the AP can request information from an AFC server and not clients, as the clients get their power levels from the APs.

Accordingly, as discussed herein, different devices can refer to different APs from the same location or neighbor locations. Clients do not send AFC requests on their own, as they can depend on the information from their AP to which they are connected to get their transmit power limits.

Accordingly, to that end, the disclosed systems and methods provide an operational framework that imparts a technical solution to address such shortcomings, among others, by providing multiple operational solutions between devices, APs, and the like to avoid interference to incumbents.

In some embodiments, the disclosed framework provides novel capabilities for handling multiple devices that are capable of performing automated frequency coordination in unlicensed bands in a given location (e.g., home/zone/small region). As discussed in more detail below, in some embodiments, the disclosed framework can control, manage and/or otherwise handle cases/instances of fairness of power and frequency allocation to ensure all users/devices receive the requisite power levels (e.g., requested, required, and/or similar power levels). According to some embodiments, the disclosed framework can handle interference from particular devices, portions of a set of devices and/or aggregations of devices within a location so that interference limits are not exceeded.

According to embodiments of the instant disclosure, it should be understood that the discussion herein that references a location can correspond to, but not be limited to, a home, office, building and/or any other type of definable structure, zone, region and/or geographic location for which a wireless network (e.g., WiFi network, for example) can be provided and/or associated therewith.

According to some embodiments, a method is disclosed for a DI-based computerized framework for controlling and managing multiple devices that are capable of performing AFC within a particular location. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for deterministically controlling and managing multiple devices that are capable of performing AFC within a particular location.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

DETAILED DESCRIPTION

Figure 1A:
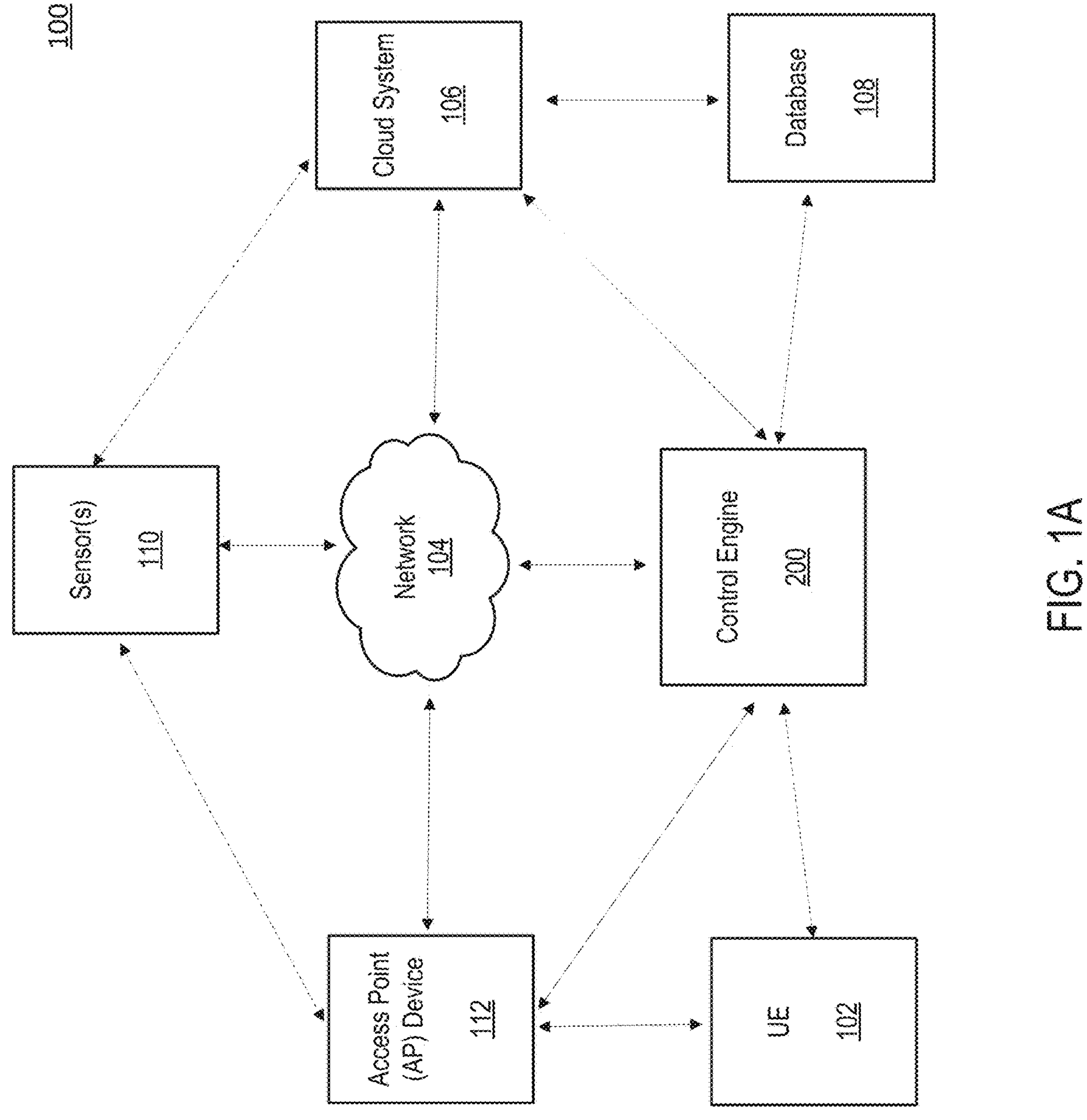
FIGS. 1A-1B are block diagrams of example configurations within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of codecontaining signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ different architectures or may be compliant or compatible with different protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles will be discussed in more detail with reference to the figures. With reference to FIG. 1A, system 100 is depicted which includes user equipment (UE) 102 (e.g., a client device, as mentioned above and discussed below in relation to FIG. 6), AP device 112, network 104, cloud system 106, database 108, sensors 110 and automated frequency coordination (AFC) engine 200. It should be understood that while system 100 is depicted as including such components, it should not be construed as limiting, as one of ordinary skill in the art would readily understand that varying numbers of UEs, AP devices, peripheral devices, sensors, cloud systems, databases and networks can be utilized; however, for purposes of explanation, system 100 is discussed in relation to the example depiction in FIG. 1A.

According to some embodiments, UE 102 can be any type of device, such as, but not limited to, a mobile phone, tablet, laptop, sensor, Internet of Things (IoT) device, wearable device, autonomous machine, smart television, media streaming device, game console, and any other device equipped with a cellular or wireless or wired transceiver.

In some embodiments, peripheral devices (not shown) can be connected to UE 102, and can be any type of peripheral device, such as, but not limited to, a wearable device (e.g., smart ring, smart watch, for example), printer, speaker, sensor, and the like. In some embodiments, a peripheral device can be any type of device that is connectable to UE 102 via any type of known or to be known pairing mechanism, including, but not limited to, WiFi, Bluetooth™, Bluetooth Low Energy (BLE), NFC, and the like.

According to some embodiments, AP device 112 is a device that creates and/or provides a wireless local area network (WLAN) for the location. According to some embodiments, the AP device 112 can be, but is not limited to, a router, switch, hub, gateway, extender and/or any other type of network hardware that can project a WiFi signal to a designated area. In some embodiments, UE 102 may be an AP device.

According to some embodiments, sensors 110 can correspond to any type of device, component and/or sensor associated with a location of system 100 (referred to, collectively, as "sensors"). In some embodiments, the sensors 110 can be any type of device that is capable of sensing and capturing data/metadata related to activity of the location. For example, the sensors 110 can include, but not be limited to, cameras, motion detectors, door and window contacts, heat and smoke detectors, passive infrared (PIR) sensors, time-of-flight (ToF) sensors, and the like. In some embodiments, the sensors can be associated with devices associated with the location of system 100, such as, for example, lights, smart locks, garage doors, smart appliances (e.g., thermostat, refrigerator, television, personal assistants (e.g., Alexa®, Nest®, for example)), smart phones, smart watches or other wearables, tablets, personal computers, and the like, and some combination thereof. For example, the sensors 110 can include the sensors on UE 102 (e.g., smart phone) and/or peripheral device (e.g., a paired smart ring). In some embodiments, sensors 110 can be associated with any device connected and/or operating on cloud system 106 (e.g., a cloud-based device, such as a server that collects information related to the location, for example).

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a smart home or network provider (e.g., Plume Design®), which has associated network resources hosted on the internet or private network (e.g., network 104), which enables (via engine 200) the network management discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE 102, AP device 112, sensors 110, and the services and applications provided by cloud system 106 and/or AFC control engine 200).

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 4:
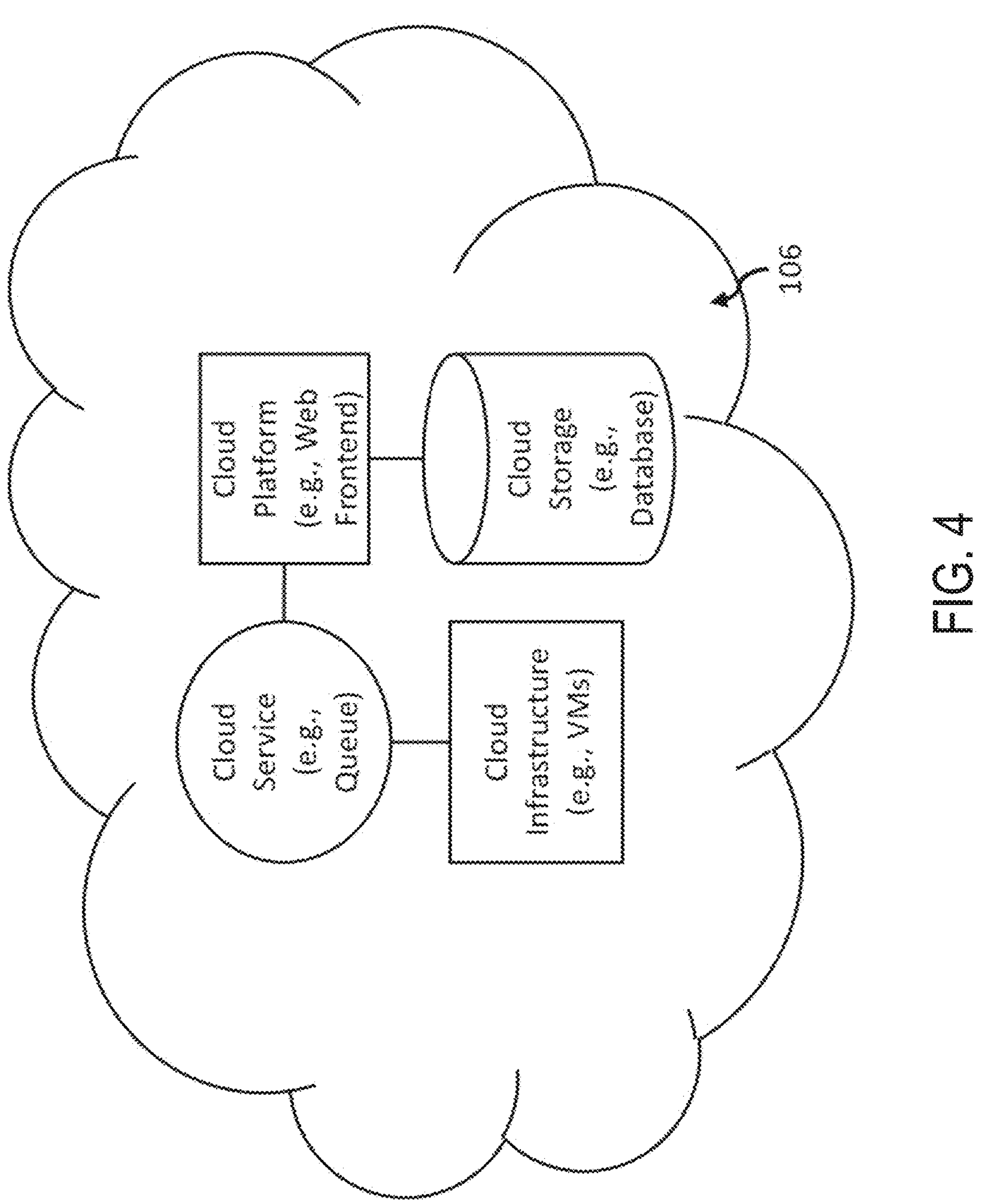
FIG. 4 depicts an exemplary implementation of an architecture according to some embodiments of the present disclosure.
Figure 5:
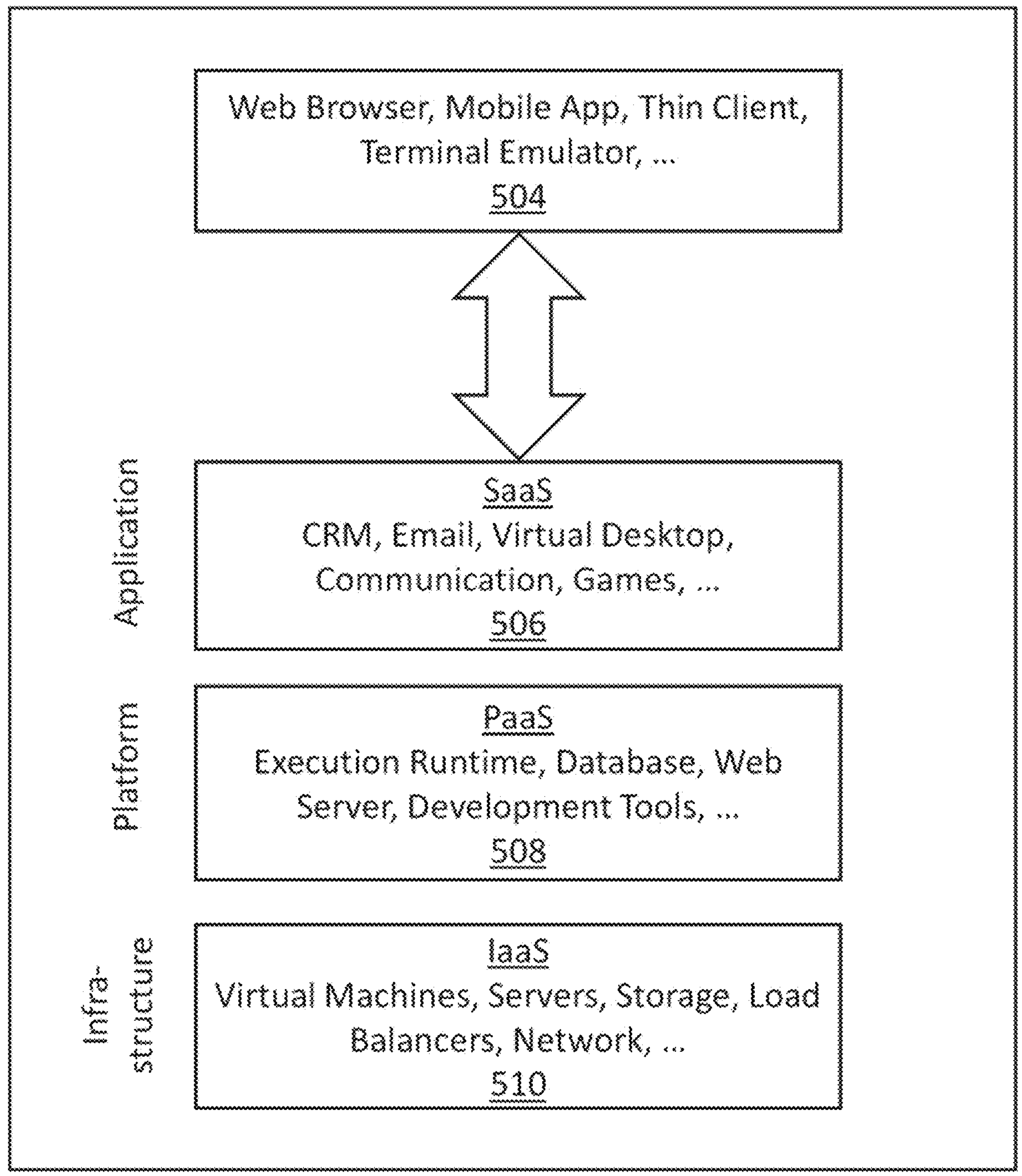
FIG. 5 depicts an exemplary implementation of an architecture according to some embodiments of the present disclosure.

Turning to FIGS. 4 and 5, in some embodiments, the exemplary computer-based systems/platforms, the exemplary computer-based devices, and/or the exemplary computer-based components of the present disclosure may be specifically configured to operate in a cloud computing/architecture 106 such as, but not limiting to: infrastructure as a service (IaaS) 510, platform as a service (PaaS) 508, and/or software as a service (SaaS) 506 using a web browser, mobile app, thin client, terminal emulator or other endpoint 504. FIGS. 4 and 5 illustrate schematics of non-limiting implementations of the cloud computing/architecture(s) in which the exemplary computer-based systems for administrative customizations and control of network-hosted application program interfaces (APIs) of the present disclosure may be specifically configured to operate.

Turning back to FIG. 1A, according to some embodiments, database 108 may correspond to a data storage for a platform (e.g., a network hosted platform, such as cloud system 106, as discussed supra) or a plurality of platforms. Database 108 may receive storage instructions/requests from, for example, engine 200 (and associated microservices), which may be in any type of known or to be known format, such as, for example, structured query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

AFC control engine 200, as discussed above and further below in more detail, can include components for the disclosed functionality. According to some embodiments, AFC control engine 200 may be a special purpose machine or processor, and can be hosted by a device on network 104, within cloud system 106, on AP device 112 and/or on UE 102. In some embodiments, engine 200 may be hosted by a server and/or set of servers associated with cloud system 106.

According to some embodiments, as discussed in more detail below, AFC control engine 200 may be configured to implement and/or control a plurality of services and/or microservices, where each of the plurality of services/microservices are configured to execute a plurality of workflows associated with performing the disclosed network management. Non-limiting embodiments of such workflows are discussed and provided below.

According to some embodiments, as discussed above, AFC control engine 200 may function as an application provided by cloud system 106. In some embodiments, engine 200 may function as an application installed on a server(s), network location and/or other type of network resource associated with system 106. In some embodiments, engine 200 may function as an application installed and/or executing on AP device 112 and/or UE 102 (and/or sensors 110). In some embodiments, such application may be a web-based application accessed by AP device 112 and/or UE 102, and/or devices associated with sensors 110 over network 104 from cloud system 106. In some embodiments, engine 200 may be configured and/or installed as an augmenting script, program or application (e.g., a plug-in or extension) to another application or program provided by cloud system 106 and/or executing on AP device 112, UE 102 and/or sensors 110.

Figure 2:
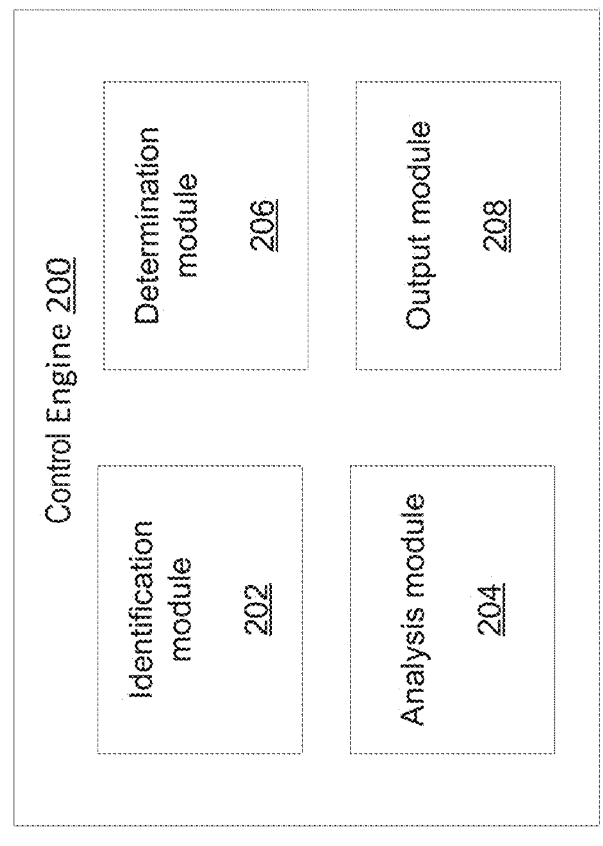
FIG. 2 is a block diagram illustrating components of an exemplary system according to some embodiments of the present disclosure.

As illustrated in FIG. 2, according to some embodiments, AFC control engine 200 includes identification module 202, analysis module 204, determination module 206 and output module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Figure 1B:
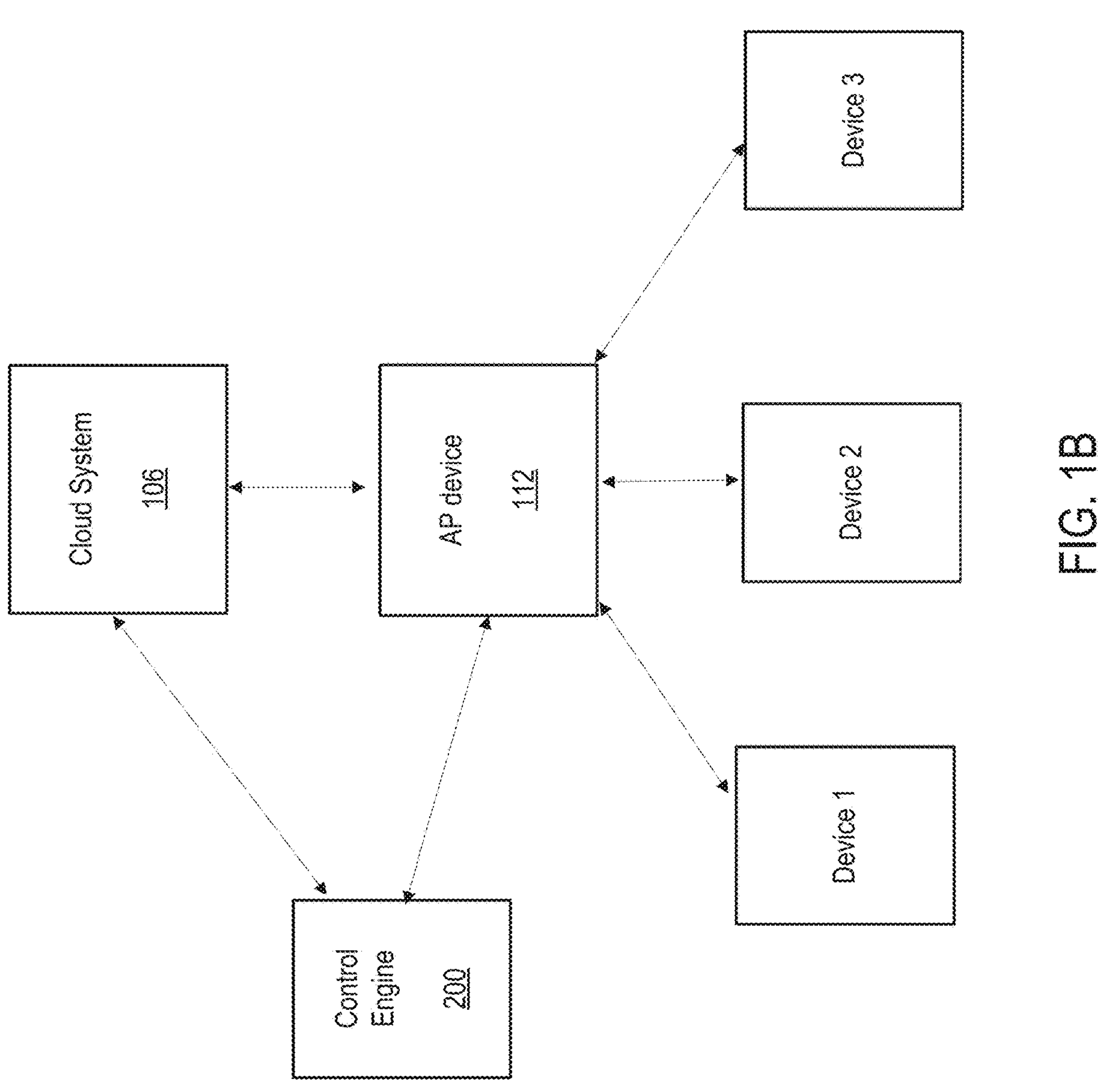

Turning to FIG. 1B, depicted is a non-limiting example system embodiment 150. According to some embodiments, embodiment 150 includes cloud system 106 (e.g., which can include a cloud controller, for example), AP device 112, AFC control engine 200 (e.g., which as mentioned above and discussed in more detail below, can operate as a network management interface controller), and devices 1, device 2 and device 3. It should be understood that while embodiment 150 is depicted as including such components, it should not be construed as limiting, as one of ordinary skill in the art would readily understand that varying numbers of UEs, AP devices, cloud systems, and the like (e.g., as discussed with reference to FIG. 1A, supra) can be utilized; however, for purposes of explanation, the example discussed with reference to embodiment 150 is discussed in relation to the example depiction in FIG. 1B).

Embodiment 150 provides a depiction of a typical WiFi deployment in a location (e.g., home), with multiple devices (e.g., device 1, device 2, device 3) connecting to the internet via AP device 112. According to some implementations, each device (1-3) and/or AP device 112 can be compatible with any type of known or to be known WiFi capability, such as, but not limited to, WiFi 6E, WiFi 7 and/or any other type of advanced generation capability, and/or any other technology supporting wireless transmissions in the unlicensed bands with incumbents, such as, but not limited to, 3.5 GHz, 5 GHz, 6 GHz, and the like.

Figure 3:
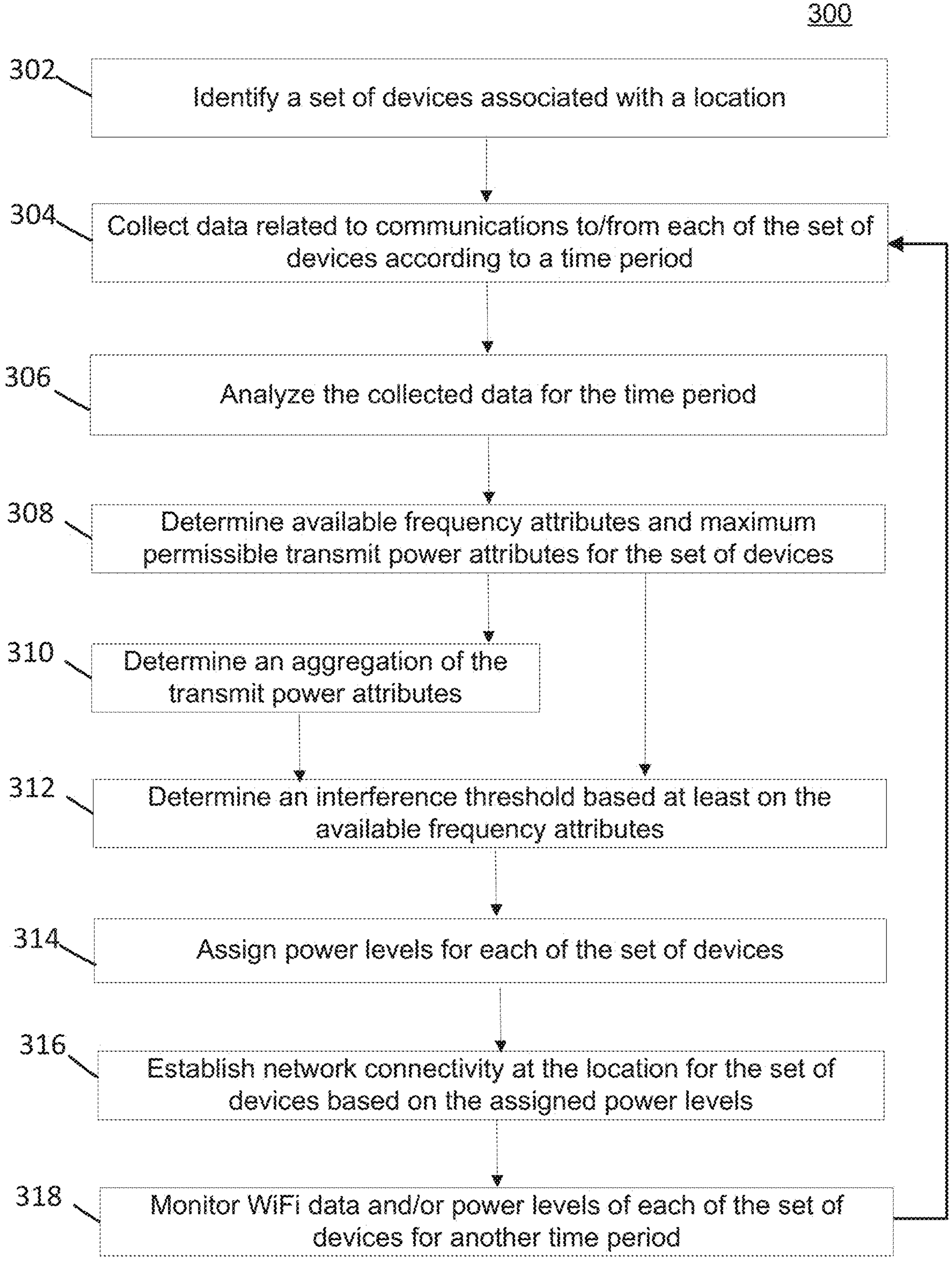
FIG. 3 illustrates an exemplary workflow according to some embodiments of the present disclosure.

Turning to FIG. 3, Process 300 provides non-limiting example embodiments for the disclosed network management functionality, as discussed herein. As provided below, the disclosed framework's configuration and implementation can provide a computerized suite of AFC tools for managing network configurations, optimizations, connections, and the like.

According to some embodiments, the disclosed functionality provided via Process 300 can enable an AFC system to handle multiple requests for transmission in the unlicensed bands. The disclosed framework, via execution of the steps in Process 300, can allocate resources, time and/or frequencies to a portion of such devices so as to ensure and/or monitor that interference values/thresholds are not exceeded. Moreover, as discussed herein, the disclosed framework, via the execution of Process 300, can handle requests received at various times of the day from a single and/or various devices within a single location.

According to some embodiments, Steps 302, 304 and 318 of Process 300 can be performed by identification module 202 of AFC control engine 200; Step 306 can be performed by analysis module 204; Steps 308-312 can be performed by determination module 206; and Steps 314 and 316 can be performed by output module 208.

According to some embodiments, Process 300 can begin with Step 302 where engine 200 can identify a set of devices at a location. In some embodiments, the location can correspond to any type of geographic area; and in some embodiments, such location can be a zone (e.g., 5 sqm×5 sqm, 10 sqm×10 sqm and the like, within a location), for example.

In some embodiments, the set of devices can include, but are not limited to, UEs, AP devices, sensors, and the like, as discussed above in FIG. 1A. Moreover, as discussed above at least with reference to FIGS. 1A-1B, an AP device can be associated with and/or provide access to such devices to a WiFi network for a location (e.g., home, office, and the like).

In some embodiments, Step 302 can involve identifying information related to the devices, location, users, network, and the like. For example, the location can have a "Zone ID," which can correspond to information that is defined by latitude and longitude data, GPS data, and the like. For example, coordinate data can include directions in terms of azimuth and elevation angles to be used by the devices in order to avoid interference to incumbents. In some embodiments, such identifiers of the information from the requests can be embedded in the messages so that engine 200 can process them via an extraction operation upon receiving the messages.

According to some embodiments, when a device (e.g., UE 102) connects to a WiFi AP device (e.g., AP device 112), the connection begins by the device scanning for available wireless networks in its vicinity. This can involve detecting the broadcasted service set identifier (SSID) signals of nearby WiFi AP devices. Once a specific WiFi network is selected, the device proceeds to the authentication phase for secured networks. Authentication typically involves entering a password or other security credentials. After successful authentication, the device associates itself with the selected WiFi access point. During this association, the device and the access point establish a connection and negotiate communication parameters. In some embodiments, if the WiFi network uses TCP/IP, the device may obtain an IP address from the AP device to enable communication within the network and access to the internet. Once these steps are completed, the device is effectively connected to the WiFi AP device, allowing it to communicate with other devices on the same network and access online resources through the AP device's connection to the internet.

In some embodiments, a device within the set of devices for the location can act as a proxy, so that a single communication can represent the whole of the set of devices. In some embodiments, an AP device for the location can aggregate the communicated data from each UE. In some embodiments, such proxy can be utilized for mesh networks.

In Step 304, engine 200 can involve collecting data related to the communications to/from each of the set of devices according to a time period (e.g., a day, for example). According to some embodiments, such collection can occur per device at the location (e.g., on the WiFi network) and for each request/response pair for the time period.

According to some embodiments, the collected data can include, but is not limited to, signal strength (received signal strength indicators (RSSIs)), channel occupancy, noise level, interference detection, channel quality metrics (e.g., signal to noise ratio (SNR), signal to interference ratio (SIR), throughput, transfer rate, and the like), network load and traffic analysis, real time conditions (e.g., channel utilization, packet loss, latency, Quality of Service (QoS), roaming and handover, and the like), and the like.

As discussed above, and in more detail below, collecting and analyzing such types of data allows AFC mechanisms to make informed decisions about frequency and power allocations, optimizing the performance and reliability of Wi-Fi networks. Moreover, such computational analysis and network configuration based therefrom enables the avoidance of interference, improving network efficiency and ensuring compliance with regulatory standards.

In some embodiments, such collected data can be stored in database 108, as discussed above. That is, according to some embodiments, as discussed herein, engine 200 can store each request and corresponding information within the time period (e.g., 24 hours, for example). Engine 200, as discussed herein, can accumulate and assimilate the requests, and send responses to the devices during, after, and/or a combination thereof the time period. Accordingly, engine 200 can handle the requests/responses for the location, which can be a small zone (e.g., 10 sqm×10 sqm, as discussed in an above example). Moreover, as provided below, in some embodiments, engine 200 can group and/or identify aggregate power to be sent to the location to all and/or a portion of the devices, which can occur simultaneously for each device and/or in a delayed manner (e.g., according to the next time period, for example).

In some embodiments, each time a device (e.g., node) from a given location requests for spectrum access, engine 200 can calculate an overall interference and assign a lower power level until the power levels for the location can be determined, as discussed below. In some embodiments, such assignment may be deferred for a first device requesting spectrum access.

Accordingly, in Step 306, engine 200 can analyze the collected data. In some embodiments, such analysis can be performed upon the completion of the collection, upon certain thresholds being satisfied during collection (e.g., x amount of interference, for example), upon certain events (e.g., upon a quantity of the RSSI data satisfying a quantity threshold), in real-time as it is collected, and the like, or some combination thereof.

According to some embodiments, Step 306 can involve engine 200 analyzing the collected data by engine 200 executing a specific trained artificial intelligence (AI)/ML model, a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, engine 200 may be configured to utilize one or more AI/ML techniques selected from, but not limited to, computer vision, feature vector analysis, decision trees, boosting, support-vector machines, neural networks, nearest neighbor algorithms, Naive Bayes, bagging, random forests, logistic regression, and the like.

In some embodiments and, optionally, in combination of any embodiment described above or below, a neural network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:

a. define Neural Network architecture/model,
b. transfer the input data to the neural network model,
c. train the model incrementally,
d. determine the accuracy for a specific number of timesteps,
e. apply the trained model to process the newly received input data,
f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

Thus, based on the analysis of the collected data, in Step 308, engine 200 can determine available frequency attributes a maximum permissible power attributes for the set of devices. Such determination can be for each device, or according to a grouping of the devices (or aggregate of at least a portion of the set of devices).

According to some embodiments, as discussed above, AFC mechanisms for a WiFi network involve managing and adjusting the frequency attributes and permissible power transmit attributes to optimize the performance of wireless devices. Accordingly, the Step 308's determination can involve determining the following frequency attributes and power transmit attributes.

In some embodiments, frequency attributes can include, but are not limited to, channel selection, channel width, channel bonding, dynamic channel allocation, frequency hopping, and the like.

According to some embodiments, for example: channel selection can correspond to determining the appropriate frequency channel for a communication(s), whereby channels can be specific to specific bands (e.g., 2.4 GHz, 5 GHz, 6 GHz, and the like); channel width can correspond to configuring the width of the frequency channels (e.g., common channel widths include 20 MHz, 40 MHz, 80 MHz, 160 MHz, and the like, for example); channel bonding can correspond to combining adjacent channels to increase bandwidth (e.g., bonding channels can enhance data transfer rates but may also increase susceptibility to interference); dynamic channel allocation can correspond to automatically selecting and adjusting channels based on real-time conditions (e.g., adapting to changes in interference and congestion for optimal performance); and frequency Hopping correspond to employing frequency hopping techniques to switch between channels dynamically (e.g., mitigating interference by avoiding congested channels).

In some embodiments, power transmit attributes can correspond to transmit power control (TPC), power levels, dynamic transmit power control (DTPC), power savings modes, beamforming, regulatory compliance, interference mitigation, QoS and range considerations, and the like.

According to some embodiments, for example: TPC can correspond to adjusting the transmit power level of devices based on real-time condition (e.g., TPC helps manage interference and optimize power consumption); power levels can correspond to defining permissible power levels for devices within regulatory limits (e.g., adhering to local regulations governing the maximum allowable power); DTPC can correspond to dynamically adjusting transmit power based on environmental conditions (e.g., optimizing power levels to balance coverage and minimize interference); power savings modes can correspond to implementing power-saving features for devices during periods of inactivity (e.g., reducing transmit power when devices are not actively transmitting data); beamforming can correspond to utilizing beamforming techniques to focus and direct the signal (e.g., enhancing signal strength and coverage in specific directions); regulatory compliance can correspond to ensuring that the transmit power levels comply with local regulatory requirements (e.g., adapting settings to adhere to frequency and power regulations); interference mitigation can correspond to adjusting transmit power to mitigate interference from neighboring networks (e.g., avoiding excessive power levels that may cause interference); and QoS and range considerations can correspond to balancing transmit power to achieve the desired QoS and coverage range (e.g., ensuring reliable communication while optimizing power consumption).

Accordingly, as discussed herein, effective AFC mechanisms consider both frequency and power attributes in tandem, dynamically adjusting settings to maintain optimal performance and comply with regulatory constraints. These adjustments can be performed to adapt to changing network conditions and user requirements, and compliance with local regulations can be paramount to ensure that the AFC operations align with legal requirements related to frequency and power usage in the respective geographic region of the location.

In some embodiments, upon the completion of Step 310, engine 200 can aggregate the transmit power attributes for the set of devices, as in Step 310. For example, with reference to FIG. 1B, the power attributes for device 1, device 2 and device 3 can be aggregated into a single transmit power attribute. In some embodiments, such aggregation can be an average, sum or other compilation of the attributes that enables the effective aggregate to represent each device within the aggregate grouping.

In Step 312, which in some embodiments can be performed based on the completion of Step 308 or Steps 308-310, as depicted in FIG. 3, engine 300 can determine an interference threshold based at least on the available frequency attributes (determined from Step 308, discussed supra). According to some embodiments, such threshold determination can be based on engine 200 performing a comparative analysis of the collected data based on the determined frequency attributes via the AI/ML techniques discussed above.

According to some embodiments, an interference threshold in a wireless network can be determined based on frequency attributes by considering the acceptable level of interference that can be tolerated without significantly degrading the quality of the communication (e.g., at the location, and/or by and/or between the devices). In some embodiments, such threshold can be influenced by the frequency bands in use, channel characteristics, the specific modulation and coding schemes employed, and the like. Accordingly, in some embodiments, to establish an interference threshold, engine 200 can analyze factors such as, but not limited to, SNR, signal strength, and the like, whereby by monitoring the frequency attributes, engine 200 can identify and set thresholds that define the acceptable limits for interference, ensuring that the network operates within desired performance parameters. The interference threshold is crucial for making dynamic decisions, such as channel selection and transmit power adjustments, to mitigate interference and optimize the overall efficiency and reliability of the wireless communication system.

In Step 314, engine 200 can assign power levels for each of the set of devices. Such assignment ensures that the interference threshold (from Step 312) is not met or surpassed.

According to some embodiments, AFC power levels in a WiFi network can be established to align with interference thresholds (see Step 314, supra) through a dynamic and adaptive approach. According to some embodiments, AFC mechanisms, including Dynamic Power Control (DPC) operations executed by engine 200, can (continuously and/or periodically) monitor the wireless environment of the location, focusing on factors like SNR and signal strength, inter alia, to detect interference sources. As discussed above, interference thresholds can be set, which can define acceptable levels of interference, and establish policies guiding the AFC system in adjusting power levels when interference exceeds these predefined limits. Accordingly, engine 200 can utilize spectrum analysis tools to identify channels with lower interference levels, and adaptive frequency selection (AFS) operations to dynamically select suitable frequencies based on this analysis. Such monitoring enables engine 200 to make prompt adjustments, optimizing power levels to adapt to changing interference conditions while maintaining compliance with regulatory requirements. Indeed, as discussed herein, engine 200 can employ advanced techniques such as AI/ML algorithms to predict interference patterns, allowing proactive adjustments to power levels.

Accordingly, engine 200 can provide AFC power level management that balances between maintaining reliable communication and minimizing interference, promoting efficient spectrum utilization in the WiFi network(s) of the location.

Thus, in Step 316, engine 200 can deploy the power (and frequency) attributes associated with the assigned power levels to each of the set of devices. Such deployment can involve executable instructions being compiled and sent as electronic messages that cause such devices to operate at the assigned power levels (and according to the defined frequencies, in some embodiments). In some embodiments, such connections can be specific to particular bands, which can correspond to the power levels for which each device is assigned. As discussed above, each device can be assigned a similar power level, or differing power level whereby the interface for the location is minimized, reduced or avoided; accordingly, such power level control of the devices may cause them to operate on particular bands, utilizing particular radios, and the like. For example, if the power level for each device is set between 4 to 16 dBm, then each device can utilize the 6 GHz band.

According to some embodiments, engine 200 can implement time and/or frequency multiplexing operations so that AFC responses can be staggered, such that various channels and/or bandwidths can be utilized by the devices in the set of devices. Among other benefits, this can assist in the avoiding and/or reducing interference.

And, in Step 318, engine 200 can monitor the activity (e.g., WiFi data and/or power levels) of each of the set of devices for another time period. Such monitoring can be performed in a similar manner as discussed above, whereby, as in Step 304, engine 200 can collect the data during such monitoring operation. Thus, Process 300 can be recursively performed to track, manage and manipulate the network and the power usage for subsequent time periods.

Thus, the disclosed systems and methods provide intuitive mechanisms for controlling and managing multiple devices that are capable of performing AFC within a particular location.

Figure 6:
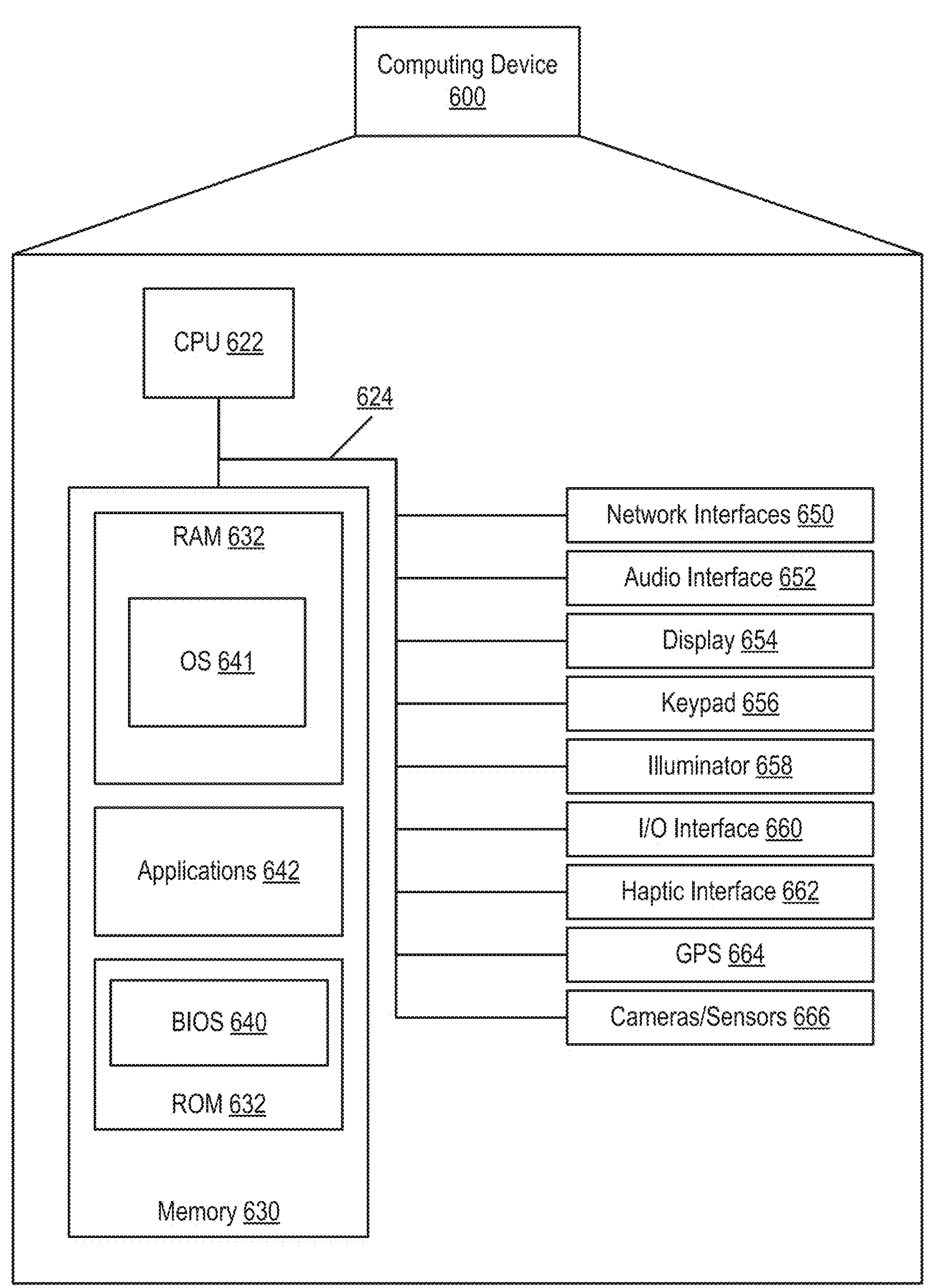
FIG. 6 is a block diagram illustrating a computing device showing an example of a client or server device used in various embodiments of the present disclosure.

FIG. 6 is a schematic diagram illustrating a client device showing an example embodiment of a client device that may be used within the present disclosure. Client device 600 may include many more or less components than those shown in FIG. 6. However, the components shown are sufficient to disclose an illustrative embodiment for implementing the present disclosure. Client device 600 may represent, for example, UE 102 discussed above at least in relation to FIG. 1.

As shown in the figure, in some embodiments, Client device 600 includes a processing unit (CPU) 622 in communication with a mass memory 630 via a bus 624. Client device 600 also includes a power supply 626, one or more network interfaces 650, an audio interface 652, a display 654, a keypad 656, an illuminator 658, an input/output interface 660, a haptic interface 662, an optional global positioning systems (GPS) receiver 664 and a camera(s) or other optical, thermal or electromagnetic sensors 666. Device 600 can include one camera/sensor 666, or a plurality of cameras/sensors 666, as understood by those of skill in the art. Power supply 626 provides power to Client device 600.

Client device 600 may optionally communicate with a base station (not shown), or directly with another computing device. In some embodiments, network interface 650 is sometimes known as a transceiver, transceiving device, or network interface card (NIC).

Audio interface 652 is arranged to produce and receive audio signals such as the sound of a human voice in some embodiments. Display 654 may be a liquid crystal display (LCD), gas plasma, light emitting diode (LED), or any other type of display used with a computing device. Display 654 may also include a touch sensitive screen arranged to receive input from an object such as a stylus or a digit from a human hand.

Keypad 656 may include any input device arranged to receive input from a user. Illuminator 658 may provide a status indication and/or provide light.

Client device 600 also includes input/output interface 660 for communicating with external. Input/output interface 660 can utilize one or more communication technologies, such as USB, infrared, Bluetooth™, or the like in some embodiments. Haptic interface 662 is arranged to provide tactile feedback to a user of the client device.

Optional GPS transceiver 664 can determine the physical coordinates of Client device 600 on the surface of the Earth, which typically outputs a location as latitude and longitude values. GPS transceiver 664 can also employ other geo-positioning mechanisms, including, but not limited to, tri-angulation, assisted GPS (AGPS), E-OTD, CI, SAI, ETA, BSS or the like, to further determine the physical location of client device 600 on the surface of the Earth. In one embodiment, however, Client device 600 may through other components, provide other information that may be employed to determine a physical location of the device, including for example, a MAC address, Internet Protocol (IP) address, or the like.

Mass memory 630 includes a RAM 632, a ROM 634, and other storage means. Mass memory 630 illustrates another example of computer storage media for storage of information such as computer readable instructions, data structures, program modules or other data. Mass memory 630 stores a basic input/output system ("BIOS") 640 for controlling low-level operation of Client device 600. The mass memory also stores an operating system 641 for controlling the operation of Client device 600.

Memory 630 further includes one or more data stores, which can be utilized by Client device 600 to store, among other things, applications 642 and/or other information or data. For example, data stores may be employed to store information that describes various capabilities of Client device 600. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 600.

Applications 642 may include computer executable instructions which, when executed by Client device 600, transmit, receive, and/or otherwise process audio, video, images, and enable telecommunication with a server and/or another user of another client device. Applications 642 may further include a client that is configured to send, to receive, and/or to otherwise process gaming, goods/services and/or other forms of data, messages and content hosted and provided by the platform associated with engine 200 and its affiliates.

According to some embodiments, certain aspects of the instant disclosure can be embodied via functionality discussed herein, as disclosed supra. According to some embodiments, some non-limiting aspects can include, but are not limited to the below method aspects, which can additionally be embodied as system, apparatus and/or device functionality:

Aspect 1. A method comprising:

identifying a set of devices at a location, the set of devices connected to a WiFi network;

collecting, according to a time period, data associated with each of the devices in the set of devices, the collected data;

analyzing the collected data, and determining, based on the analysis, available frequency attributes and maximum permissible transmit power attributes for the set of devices;

determining, based on the determined available frequency attributes, an interference threshold for the location;

determining, based on the determined interference threshold, power levels for each of the set of devices; and establishing network connectivity for each of the set of devices based on the determined power levels for each of the set of devices.

Aspect 2. The method of aspect 1, further comprising:

executing dynamic power control (DPC) operations to detect interference sources on the WiFi network, wherein the interference threshold is determined based on the DPC operations; and assigning power levels based on the DPC operations which enable monitoring of the WiFi network.

Aspect 3. The method of aspect 2, further comprising:

adjusting the power levels based on the monitoring and the interference threshold, wherein the adaption of the power levels comprises predicting interference patterns and proactively adjusting the power levels based on the predicted interference patterns.

Aspect 4. The method of claim 1, wherein the set of devices comprises an access point device and a plurality of a user devices.

Aspect 5. The method of aspect 4, further comprising:

receiving, by the access point device, requests from the plurality of user devices; and communicating, according to the time period, responses to each of the plurality of user devices.

Aspect 6. The method of aspect 5, wherein the collection of data is based on the requests and responses.

Aspect 7. The method of aspect 1, wherein the collected data comprises information related to at least one of signal strength, channel occupancy, noise level, interference detection, channel quality metrics, network load and traffic analysis and real time conditions.

Aspect 8. The method of aspect 1, wherein the available frequency attributes and maximum permissible transmit power attributes for the set of devices are determined for each of the set of devices.

Aspect 9. The method of aspect 1, further comprising:

aggregating the available frequency attributes and maximum permissible transmit power attributes for the set of devices for each of the set of devices; and performing the interference threshold determination based on the aggregated available frequency attributes and maximum permissible transmit power attributes for the set of devices.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, API, instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

identifying a set of devices at a location, the set of devices connected to a WiFi network;

collecting, according to a time period, data associated with each of the devices in the set of devices, the collected data;

analyzing the collected data, and determining, based on the analysis, available frequency attributes and maximum permissible transmit power attributes for the set of devices;

determining, based on the determined available frequency attributes, an interference threshold for the location;

determining, based on the determined interference threshold, power levels for each of the set of devices; and establishing network connectivity for each of the set of devices based on the determined power levels for each of the set of devices.

2. The method of claim 1, further comprising:

executing dynamic power control (DPC) operations to detect interference sources on the WiFi network, wherein the interference threshold is determined based on the DPC operations; and assigning power levels based on the DPC operations which enable monitoring of the WiFi network.

3. The method of claim 2, further comprising:

adjusting the power levels based on the monitoring and the interference threshold, wherein the adaption of the power levels comprises predicting interference patterns and proactively adjusting the power levels based on the predicted interference patterns.

4. The method of claim 1, wherein the set of devices comprises an access point device and a plurality of a user devices.

5. The method of claim 4, further comprising:

receiving, by the access point device, requests from the plurality of user devices; and communicating, according to the time period, responses to each of the plurality of user devices.

6. The method of claim 5, wherein the collection of data is based on the requests and responses.

7. The method of claim 1, wherein the collected data comprises information related to at least one of signal strength, channel occupancy, noise level, interference detection, channel quality metrics, network load and traffic analysis and real time conditions.

8. The method of claim 1, wherein the available frequency attributes and maximum permissible transmit power attributes for the set of devices are determined for each of the set of devices.

9. The method of claim 1, further comprising:

aggregating the available frequency attributes and maximum permissible transmit power attributes for the set of devices for each of the set of devices; and performing the interference threshold determination based on the aggregated available frequency attributes and maximum permissible transmit power attributes for the set of devices.

10. A system comprising:

a processor configured to:

identify a set of devices at a location, the set of devices connected to a WiFi network;

collect, according to a time period, data associated with each of the devices in the set of devices, the collected data;

analyze the collected data, and determining, based on the analysis, available frequency attributes and maximum permissible transmit power attributes for the set of devices;

determine, based on the determined available frequency attributes, an interference threshold for the location;

determine, based on the determined interference threshold, power levels for each of the set of devices; and establish network connectivity for each of the set of devices based on the determined power levels for each of the set of devices.

11. The system of claim 10, wherein the processor is further configured to: execute dynamic power control (DPC) operations to detect interference sources on the WiFi network, wherein the interference threshold is determined based on the DPC operations; assign power levels based on the DPC operations which enable monitoring of the WiFi network; and adjust the power levels based on the monitoring and the interference threshold, wherein the adaption of the power levels comprises predicting interference patterns and proactively adjusting the power levels based on the predicted interference patterns.

12. The system of claim 10, wherein the set of devices comprises an access point device and a plurality of a user devices.

13. The system of claim 12, wherein the processor is further configured to:

receive, by the access point device, requests from the plurality of user devices; and communicate, according to the time period, responses to each of the plurality of user devices, wherein the collection of data is based on the requests and responses.

14. The system of claim 10, wherein the collected data comprises information related to at least one of signal strength, channel occupancy, noise level, interference detection, channel quality metrics, network load and traffic analysis and real time conditions.

15. The system of claim 10, wherein the available frequency attributes and maximum permissible transmit power attributes for the set of devices are determined for each of the set of devices.

16. The system of claim 10, wherein the processor is further configured to:

aggregate the available frequency attributes and maximum permissible transmit power attributes for the set of devices for each of the set of devices; and perform the interference threshold determination based on the aggregated available frequency attributes and maximum permissible transmit power attributes for the set of devices.

17. A non-transitory computer-readable storage medium tangibly encoded with computer-executable instructions that when executed by a processor, perform a method comprising:

identifying a set of devices at a location, the set of devices connected to a WiFi network;

collecting, according to a time period, data associated with each of the devices in the set of devices, the collected data;

analyzing the collected data, and determining, based on the analysis, available frequency attributes and maximum permissible transmit power attributes for the set of devices;

determining, based on the determined available frequency attributes, an interference threshold for the location;

determining, based on the determined interference threshold, power levels for each of the set of devices; and establishing network connectivity for each of the set of devices based on the determined power levels for each of the set of devices.

18. The method of claim 17, further comprising:

executing dynamic power control (DPC) operations to detect interference sources on the WiFi network, wherein the interference threshold is determined based on the DPC operations;

assigning power levels based on the DPC operations which enable monitoring of the WiFi network; and adjusting the power levels based on the monitoring and the interference threshold, wherein the adaption of the power levels comprises predicting interference patterns and proactively adjusting the power levels based on the predicted interference patterns.

19. The method of claim 17, wherein the set of devices comprises an access point device and a plurality of a user devices, wherein the method further comprises:

receiving, by the access point device, requests from the plurality of user devices; and communicating, according to the time period, responses to each of the plurality of user devices, wherein the collection of data is based on the requests and responses.

20. The method of claim 17, further comprising:

aggregating the available frequency attributes and maximum permissible transmit power attributes for the set of devices for each of the set of devices; and performing the interference threshold determination based on the aggregated available frequency attributes and maximum permissible transmit power attributes for the set of devices.

* * * * *